US008422392B2

(12) United States Patent
Srebranig

(10) Patent No.: US 8,422,392 B2
(45) Date of Patent: Apr. 16, 2013

(54) SYSTEM AND METHOD FOR MICROECONOMIC MULTIPLEXING OF DATA OVER COMMUNICATION CHANNELS

(75) Inventor: Steven Srebranig, Schaumburg, IL (US)

(73) Assignee: STMicroelectronics, Inc., Coppell, TX (US)

( * ) Notice: Subject to any disclaimer, the term of this patent is extended or adjusted under 35 U.S.C. 154(b) by 266 days.

(21) Appl. No.: 13/014,181

(22) Filed: Jan. 26, 2011

(65) Prior Publication Data

US 2012/0170475 A1 Jul. 5, 2012

Related U.S. Application Data

(60) Provisional application No. 61/428,855, filed on Dec. 31, 2010.

(51) Int. Cl.
*H04L 12/26* (2006.01)
*H04L 12/28* (2006.01)
*H04N 7/173* (2006.01)

(52) U.S. Cl.
USPC ...... 370/252; 370/395; 370/431; 348/E5.108; 725/116

(58) Field of Classification Search .......... 370/252–254, 370/345–432; 725/16, 109, 114, 116; 348/E5.108, 348/E5.002, E5.114; 709/105–246; 375/E7.019, 375/E7.025, 240.25; 382/232; 455/12.1, 455/3.01; 702/180
See application file for complete search history.

(56) References Cited

U.S. PATENT DOCUMENTS

| | | | | |
|---|---|---|---|---|
| 5,666,487 A * | 9/1997 | Goodman et al. | ............ | 709/246 |
| 7,131,135 B1 * | 10/2006 | Virag et al. | ...................... | 725/80 |
| 7,305,357 B2 * | 12/2007 | Hamilton | ...................... | 705/27.1 |
| 2003/0043815 A1 * | 3/2003 | Tinsley et al. | ............ | 370/395.21 |
| 2005/0152366 A1 * | 7/2005 | Heuck | ............................ | 370/390 |
| 2009/0028182 A1 * | 1/2009 | Brooks et al. | .................. | 370/466 |
| 2011/0126244 A1 * | 5/2011 | Hasek | ............................. | 725/87 |
| 2011/0255535 A1 * | 10/2011 | Tinsman | ...................... | 370/390 |
| 2011/0296475 A1 * | 12/2011 | Craner | ............................ | 725/90 |

* cited by examiner

*Primary Examiner* — Afsar M. Qureshi
(74) *Attorney, Agent, or Firm* — Graybeal Jackson LLP

(57) ABSTRACT

A system and method for optimal allocation of bandwidth in a multichannel transmission channel. In an embodiment, a system may allocate a specific amount of bandwidth in the transmission channel in order to maximize the value of the data that is transmitted on a per-channel basis. Typically, a transmission channel has enough bandwidth to accommodate the minimum bandwidth for all data across all channels. The excess bandwidth may be allocated in an optimal manner so as to provide additional bandwidth for the most valuable channels. The maximum allocation of bandwidth is a point in which allocating additional bandwidth to a channel does not yield any additional value. Such an allocation may be accomplished using an iterative analysis of the available bandwidth and a microeconomic-based analysis of the subjective value of each channel.

25 Claims, 3 Drawing Sheets

SYSTEM AND METHOD FOR MICROECONOMIC MULTIPLEXING OF DATA OVER COMMUNICATION CHANNELS

PRIORITY CLAIM

This application claims priority to U.S. Provisional Patent Application No. 61/428,855 filed on Dec. 30, 2010 entitled SYSTEM AND METHOD FOR MICROECONOMIC MULTIPLEXING OF DATA OVER COMMUNICATION CHANNELS which is incorporated herein by reference.

BACKGROUND

Communication systems and electronic devices are used in many applications across many different industries and businesses. Often, these communication systems and electronic devices use shared digital channels for communicating data to and from various electronic devices. For example, a digital broadcast audio/video receiver (commonly referred to as a set-top box) may receive data in the form of several television channels such that the data received corresponds to audio, video and other meta-data regarding one or more of several available television or radio channels. As such, when a digital stream of data is sent to a set-top box over a communication channel (e.g., a satellite signal or a digital broadband signal over a coaxial cable), it is common to multiplex all of the data together for the overall signal and then de-multiplex specific channels at the receiver.

With a growing number of television channels and radio stations in a typical entertainment package offered by satellite and broadband providers, and along with the growing number of high-definition options, the available bandwidth for delivering a single stream of data all at once becomes increasingly difficult given bandwidth limitations of the actual communication mediums. Providers must choose how to allocate the available bandwidth to deliver the optimal distribution of data in a single multiplexed signal.

BRIEF DESCRIPTION OF THE DRAWINGS

Embodiments of the subject matter disclosed herein will become more readily appreciated as the same become better understood by reference to the following detailed description, when taken in conjunction with the accompanying drawings.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

Prior to discussing specific details about aspects of the subject matter disclosed herein, an overview of the system and method is presented. In an embodiment, a system formed according to the subject matter disclosed herein may transmit data across a transmission channel having several different "channels" of data wherein each channel may comprise data designated to have a similar level of importance or value. In this manner, the system may allocate a specific amount of bandwidth in the transmission medium in order to maximize the value of the data that is transmitted. Further, each channel may have a minimum bandwidth in which the data from the channel may reasonably be transmitted without compromising the delivery at the receiver. Typically, a transmission medium has enough bandwidth to accommodate the minimum bandwidth for all data across all channels. The additional bandwidth may be allocated in an optimal manner so as to provide additional bandwidth for the most valuable channels up to each channels' maximum bandwidth. The maximum bandwidth is a point in which allocating additional bandwidth to a channel does not yield any additional value to the overall transmission. Such an allocation may be accomplished using an iterative analysis of the available bandwidth and a microeconomic-based analysis of the subjective value of each channel as well as an opportunity cost associated with the next best available choice for allocating bandwidth amongst the channels. These and other aspects of the subject matter are discussed below in conjunction with FIGS. 1-3.

Figure 1:
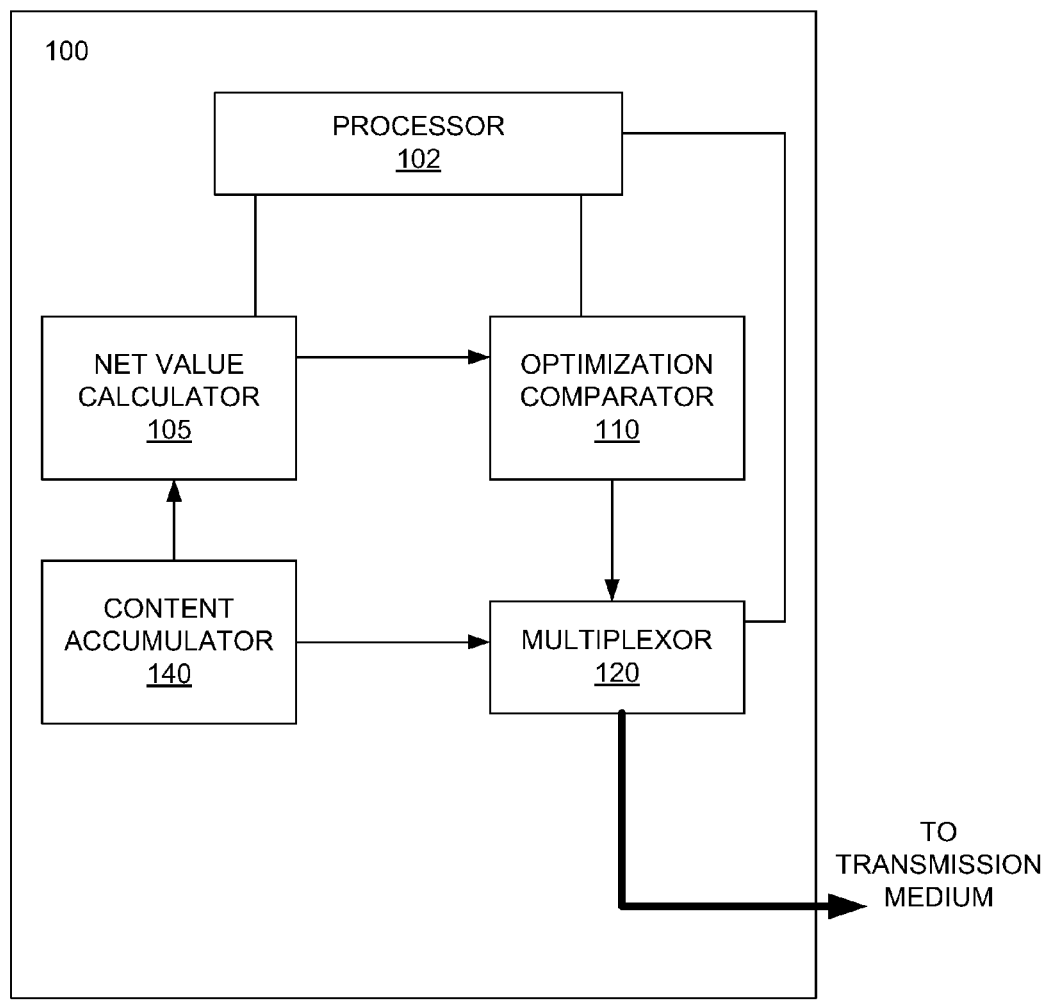
FIG. 1 is a block diagram of an embodiment of a system 100 having several components for optimizing multiplexing data across communication channels according to an embodiment of the subject matter discussed herein.

FIG. 1 is a block diagram of an embodiment of a system 100 having several components for optimizing multiplexing data across communication channels according to an embodiment of the subject matter discussed herein. The system includes a processor 102 operable to execute instructions and control the various components of the system 100 such that an optimized transmission of data across a plurality of channels on a transmission medium is accomplished. When referring to a channel for the transmission medium, it is understood by the skilled artisan that the term channel is an arbitrary classification of data into groupings and is not necessarily associated in a one-to-one relationship with common television station channels or radio station channels. Thus, a first transmission channel may include data for television channels 1-3, a second transmission channel may include data for television stations 4-10, etc. Throughout the remainder of this description, the term channel refers to a transmission channel that is an arbitrary grouping of data, typically grouped together because such data is chosen to have the same value.

Still referring to FIG. 1, to send data across the plurality of channels, a multiplexor 120 may multiplex the data in a conventional manner (such as through data coded in groupings suited for a typical packet-switched network, or the like), such that each channel may be allocated an optimal bandwidth for transmitting the data. As discussed in greater detail below, the specific bandwidth for each channel may be determined based upon the amount of data to be transmitted for each channel as well as a subjective value chosen to be associated with each channel. Such a value may be indicative of the nature of the underlying data for the channel, such that more valuable data may be given a higher value. For example, a system may have three channels for data transmission, one of which provides mission-critical data, another provides a standard definition news service, and the third provides a "pay per view" high definition movie. Then, one may define relative channel value $CV_i$ to each channel. Further, the allocation of bandwidth may be adjusted based upon a determination of the opportunity cost of not allocating bandwidth to the next most valuable option (e.g., the channel having the next highest subjective value).

One method for allocating bandwidth across various channels involves a statistical multiplexing method. Statistical multiplexing of several channels of digital information together into a single bit stream is a relatively straight forward process. In this method (which is not shown in any FIG.), priority for each channel is determined without any information as to the "real world" value of the channels. It is a method that dynamically and arbitrarily bases priority on a statistical calculus of quality. Such a calculation assumes a general equivalence of real word value across all channels irrespective of the actual value any particular channel has to either the broadcaster or a consumer.

Thus, a statistical multiplexing system is designed to increase utilization of a resource that is subject to random usage patterns, it specifically ignores intrinsic value that a consumer or content provider may place of one or more transmission channels. Statistical multiplexing assigns an allocation of limited bandwidth amongst a set of channels based upon a quality of service (QoS) metric such that bandwidth is allocated in order to ensure that each channel is guaranteed a minimum QoS. However, there exists a problem with statistical multiplexing. Such a method does not adhere to a notion of channel value, but to a priori fixing of quality on a per channel basis. That is, allocation of bandwidth to valuable channels will instead be allocated to less valuable channels in order to ensure that even the least valuable channel still has enough bandwidth to meet a minimum threshold of bits per second, i.e., QoS. One can see a drawback to statistical multiplexing then when higher QoS of valuable channels is sacrificed for evenly distributed QoS even amongst less valuable channels.

A solution to this problem is to assign a subjective relative value for each channel such that a higher value for a channel influences the allocation of bandwidth to the channel based upon a value prioritization. Prioritizing essentially means assigning a relative value to each channel; the more valuable the channel, the more bandwidth will be allocated to it. Such a value-based allocation of bandwidth may be accomplished through a microeconomic-based allocation of bandwidth across channels wherein the relative value of each channel influences the allocation of bandwidth for each channel when bandwidth is a limiting factor.

Borrowing concepts from microeconomic theory, one may define the set of channels as a closed microeconomic system. This microeconomic system may include a limited resource (i.e., available bits per second across the transmission medium often simply referred to as digital bandwidth or just bandwidth BW) having an interrelationship with goods having an intrinsic capital value (e.g., relative Quality of Service (QoS) needed per channel). The interrelationship is based on the notion of opportunity cost that associates the system together and allows optimization within the system comprised of a set of channels (the products) and limited bandwidth (the resources). Such a system may then have a specific number of channels $C_{0-n}$ that may be transmitted across a transmission channel with a limited resource of bandwidth BW. Thus, each channel $C_i$ will have a specific amount of bandwidth BW allocated for transmission based upon each channels $C_{0-n}$ size (e.g., total number of bits per second for a minimum QoS) and a relative channel value $CV_{0-n}$ for each channel $C_{0-n}$.

As briefly discussed above, the assignment of the channel value $C_i$ is based upon a system designer's subjective opinion about the relative value of each channel in relation to each other. Such channel values may be stored in a memory 103 such that when a system is initialized, each channel's value is set based upon the stored channel values. A system designer may choose to change these assigned channel values, but to do so would require a re-initialization of the system wherein the newly assigned channel values are used. Thus, when the system first starts, an initialization process sets channel values within the closed micro-economic system.

Thus, in the context of the closed microeconomic system, $CV_i$ is defined as the channel value for channel $C_i$. Principal figure $PF_i$ is defined as the cost of the resource in digital units of data measurement. A simple way to measure principle $PF_i$ is in raw data in bits per second (bps or Baud). Other principle figure $PF_i$ measurements may be used as well such as compression rate, channel cost to consumer, etc. For the purposes of the remainder of the description, bps will be used as the principle figure $PF_i$. Then, for each channel, a marginal value $MV_i$ may calculated as:

$$MV_i = CV_i * PF_i / BW$$

Next, a set of opportunity costs OC may be calculated as the marginal value lost by not applying the equivalent number of bps to the best or next best channel. That is, the opportunity cost $OC_{(i,j)}$ is the relative value of the allocation of the resource (channel's $C_i$ marginal value $MV_i$) if the allocated resource would otherwise be given to channel $C_j$. Thus, the opportunity cost is:

$$OC_{(i,j)} = CV_j * PF_i / BW$$

Finally, each channel $C_i$ may have a net value $netV_i$ calculated given its marginal value $MV_i$ and the opportunity cost $OC_{(i,maxIndex)}$ due to the loss of the next best use ($C_{maxIndex}$) of the bps currently allocated to channel $C_i$:

$$netV_i = MV_i - OC_{(i,maxIndex)}$$

The maximum value of a channel will be at the point where additional allocation of bps will not yield an increase in its net value $netV_i$. The maximum system value will be achieved when each individual channel $C_{0-n}$ has a net value $netV_i$ of zero or greater or when the available bps resource is exhausted. That is, the distribution of bps among the channels $C_{0-n}$ will then be optimum.

The above-described calculation may be executed by a calculator component 105 which is under control by the processor 102. As a set of net values $netV_{0-n}$ are calculated for a given initial allocation of bps, the allocation configuration may be sent to an optimization comparator 110 to determine if the system has reached the optimal allocation of bps settings for each channel, i.e., that all net values $netV_{0-n}$ are positive with respect to the system's opportunity costs. If the optimal allocation is not yet reached, the calculator component 105 recalculates the parameters for each channel and the overall allocation of bps per channel is adjusted in an iterative manner until the optimum allocation is reached. This iterative process may be better understood with respect to the descriptions below regarding the flowchart of FIG. 2 as well as within the context of the example that follows.

Figure 2:
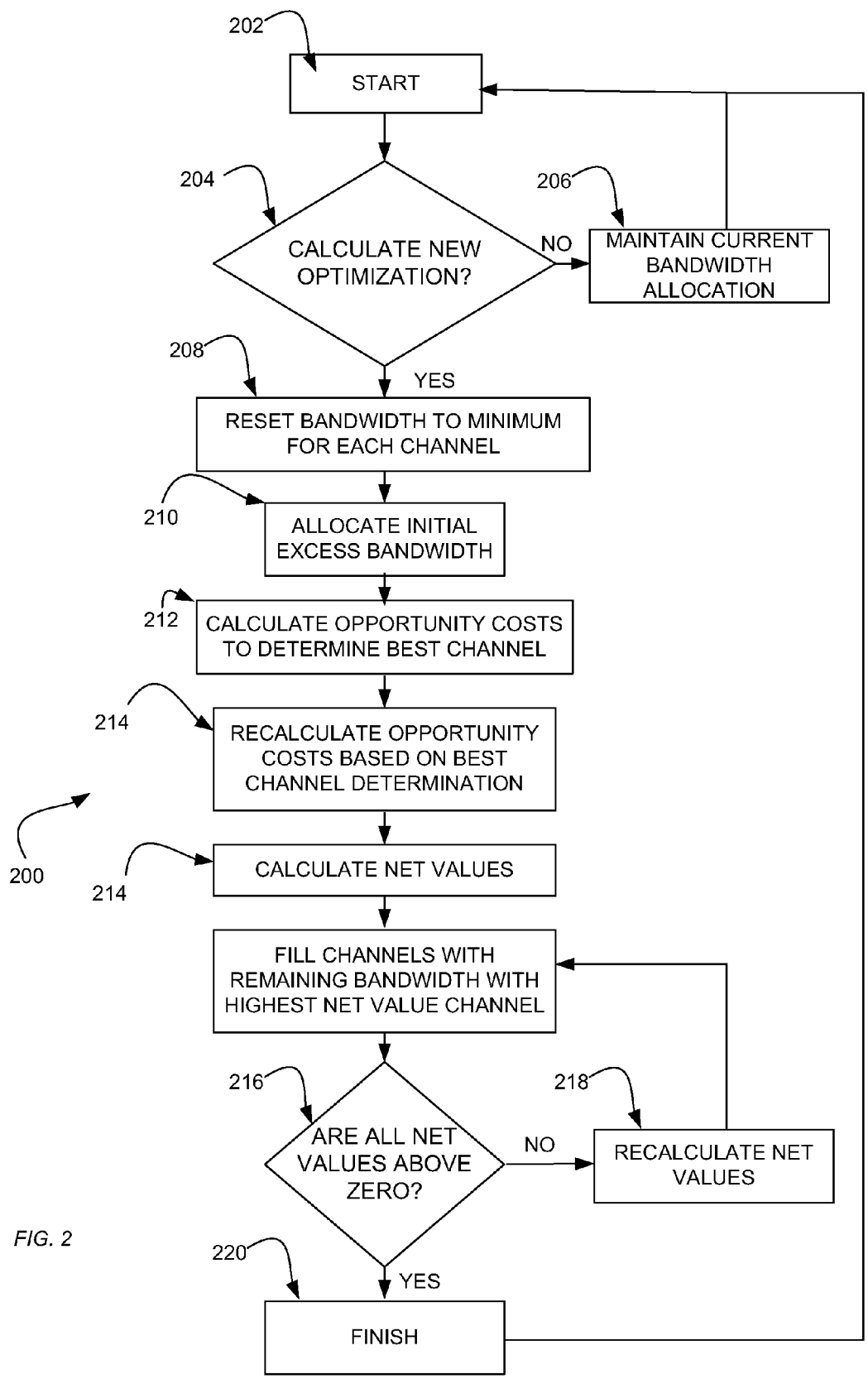
FIG. 2 is a flow chart for a method for optimizing multiplexing data across communication channels according to an embodiment of the subject matter discussed herein according to an embodiment of the subject matter disclosed herein.

FIG. 2 is a flow chart for a method for optimizing multiplexing data across communication channels according to an embodiment of the subject matter discussed herein according to an embodiment of the subject matter disclosed herein. The method may begin a starting point 202. The method proceeds to a first query step 204 that continuously monitors the system for events that would trigger a new bandwidth allocation analysis. If an event does not occur, the method maintains a continuous loop through step 206 whereby the current bandwidth allocation (e.g., specific allocation of bps previously determined to be optimal) is maintained. If an event occurs that does require a new analysis, then the method proceeds to an initialization step 208 where each channel $C_i$ may be initially set to a respective minimum required bandwidth. After allocating bandwidth for each channel's minimum requirement, excess bandwidth may be allocated initially according to a non-relative method such as assigning excess bandwidth to the channel with the highest value CV at step 210.

Next, once the available bandwidth BW is initially allocated, the above-described calculations may be made to determine the respective marginal values $MV_i$, opportunity costs $OC_i$ and net values $netV_i$ given the initial bandwidth allocation at step 212. From this first set of calculations, the best channel according to net value $netV_i$ may be determined. Thus, this particular channel is then allocated a higher amount of bandwidth than originally assigned. The additional bandwidth may be set at a fixed additional amount or be set to an arbitrary maximum across all channels, set individually for each channel. With any redistribution of bandwidth, a new set of calculations may be made at step 214 to determine a new best channel given that the allocation of bandwidth has changed.

Now, at step 215, additional bandwidth is allocated according to the newly calculated net values. If the initial allocation to the best available channel was not enough such that the same channel emerges as still the best channel, then additional bandwidth may be allocated. If another channel is the new best channel, then the new best channel gets additional bandwidth. This process repeats in an iterative manner through the query step 216 until all additional bandwidth has been allocated in a manner that the net values as calculated in step 218 are all at relative zero or greater. Once the allocation of bandwidth cannot be redistributed any further to yield a larger overall value, then the method ends at step 220.

To further illustrate the concepts of FIG. 2, an iterative example is provided next. For this example, the transmission channel will have a transmission bandwidth BW of 20 MBaud (which may be further defined as using 8 PSK modulation (3 bits per symbol), DVB-S packet structure (188 information bytes per 204 total byte packets) with a code rate of 5/6; this yields a bit rate of 3*188/204*5/6*20,000,000 or 46.08 Mbits per second). Within this transmission channel, this example will need to multiplex 18 program channels $C_0$-$C_{17}$ each having an associated channel value $CV_0$-$CV_{17}$ and bandwidth will be allocated to each program channel to achieve optimum overall value of the transmission. As several program channels $C_0$-$C_{17}$ may have the same channel values $CV_0$-$CV_{17}$, one may combine identically specified programs channels into channel groups (designated by CN where N is the group identification) to minimize the computational complexity providing the minimum band width requirements as a sum for the respective group.

Thus, within this example, each channel may have a minimum bandwidth required as follows:

$C_0$ wherein $CV_0$=200 and minimum bandwidth is 0.8 Mbps $C_1$ wherein $CV_1$=200 and minimum bandwidth is 0.8 Mbps $C_2$ wherein $CV_2$=200 and minimum bandwidth is 0.8 Mbps $C_3$ wherein $CV_3$=190 and minimum bandwidth is 1.0 Mbps $C_4$ wherein $CV_4$=180 and minimum bandwidth is 2.0 Mbps $C_5$ wherein $CV_5$=180 and minimum bandwidth is 2.0 Mbps $C_6$ wherein $CV_6$=18 and minimum bandwidth is 1.0 Mbps $C_7$ wherein $CV_7$=18 and minimum bandwidth is 1.0 Mbps $C_8$ wherein $CV_8$=18 and minimum bandwidth is 1.0 Mbps $C_9$ wherein $CV_9$=128 and minimum bandwidth is 1.8 Mbps $C_{10}$ wherein $CV_{10}$=128 and minimum bandwidth is 1.8 Mbps $C_{11}$ wherein $CV_{11}$=100 and minimum bandwidth is 4.0 Mbps $C_{12}$ wherein $CV_{12}$=100 and minimum bandwidth is 4.0 Mbps $C_{13}$ wherein $CV_{13}$=10 and minimum bandwidth is 1.0 Mbps $C_{14}$ wherein $CV_{14}$=10 and minimum bandwidth is 1.0 Mbps $C_{15}$ wherein $CV_{15}$=10 and minimum bandwidth is 1.0 Mbps $C_{16}$ wherein $CV_{16}$=79 and minimum bandwidth is 1.0 Mbps $C_{17}$ wherein $CV_{17}$=79 and minimum bandwidth is 1.0 Mbps This list then devolves into the following channel groups:

C1 includes channels $C_0$ $C_1$ and $C_2$

C2 includes channels $C_3$

C3 includes channels $C_4$ and $C_5$

C4 includes channels $C_6$ $C_7$ and $C_8$

C5 includes channels $C_9$ and $C_{10}$

C6 includes channels $C_{11}$ and $C_{12}$

C7 includes channels $C_{13}$ $C_{14}$ and $C_{15}$

C8 includes channels $C_{16}$ and $C_{17}$

The total available bandwidth BW is 46.08 Mbps and the minimum bandwidth required of all channels groups C1-C8 is 27.0 Mbps. By beginning an initial calculation using the minimum bandwidth required and allocated across the channel group accordingly, there remains 19.08 Mbps of available bandwidth to be allocated in the most optimal manner.

As an initial starting point, the total bandwidth available (46.08 Mbps in this example) may be allocated to each channel group C1-C8 first at a level of each channel group's respective minimum and then the remaining "leftover" bandwidth may be allocated by the relative value of each channel group. As can be seen in Table 1, channel group C1 may have a value of 200 that is 22% of the total value 908 of all channel groups' values. Thus, channel C1 is allocated an additional 22% of the remaining 19.08 Mbps of bandwidth, e.g., 4.217 Mbps. It is noted that this initial distribution of excess bandwidth in this example is but one way to initially distribute the excess bandwidth to establish a starting point for iteratively and optimally allocating bandwidth amongst the channel groups.

TABLE 1

| Channel | Channel Value (CV) | Relative Value | Raw Bandwidth | Minimum Bandwidth | Excess Bandwidth | Marginal Value | Opportunity Cost | Net Value |
|---|---|---|---|---|---|---|---|---|
| C1 | 200 | 0.22 | 9.60 | 2.40 | 4.217 | 44.199 | 3.805 | 40.393 |
| C2 | 190 | 0.21 | 4.18 | 1.00 | 4.006 | 39.890 | 4.438 | 35.451 |
| C3 | 180 | 0.20 | 13.00 | 4.00 | 3.795 | 35.801 | 4.685 | 31.116 |

TABLE 1-continued

| Channel | Channel Value (CV) | Relative Value | Raw Bandwidth | Minimum Bandwidth | Excess Bandwidth | Marginal Value | Opportunity Cost | Net Value |
|---|---|---|---|---|---|---|---|---|
| C5 | 128 | 0.14 | 8.36 | 3.60 | 2.699 | 18.104 | 6.588 | 11.515 |
| C6 | 100 | 0.11 | 33.60 | 8.00 | 2.108 | 11.050 | 8.433 | 2.617 |
| C8 | 79 | 0.09 | 8.36 | 2.00 | 1.666 | 6.896 | 10.675 | −3.779 |
| C4 | 18 | 0.02 | 9.60 | 2.00 | 0.379 | 0.358 | 46.851 | −46.493 |
| C7 | 10 | 0.01 | 12.40 | 3.00 | 0.211 | 0.110 | 84.331 | −84.221 |
| TOTAL | 905 | | 99.24 | 27.0 | 19.08 | 156.41 | | |

Once the initial excess bandwidth is allocated, each channel group's marginal value $MV_i$, Opportunity Cost $OC_{(i,j)}$ and net value $netV_i$ may be calculated. In this first pass, three channel groups (C8, C4, and C7 have negative net values indicating that the additional bandwidth allocated to these channel groups is not the best use of the additional bandwidth. Further, one can see at this initial pass, the total value (which an addition of all marginal values) is 156.41. Thus, another iteration of the algorithm may be calculated whereby bandwidth is added to the channel having the highest channel value up to (but not exceeding) its raw bandwidth. After a few iterations (which depends on the allocation algorithm), one can see a different allocation of the excess bandwidth as follows in Table 2.

TABLE 2

| Channel | Channel Value (CV) | Relative Value | Raw Bandwidth | Minimum Bandwidth | Excess Bandwidth | Marginal Value | Opportunity Cost | Net Value |
|---|---|---|---|---|---|---|---|---|
| C3 | 180 | 0.20 | 13.00 | 4.00 | 9.000 | 84.906 | 1.600 | 83.306 |
| C1 | 200 | 0.22 | 9.60 | 2.40 | 7.200 | 75.472 | 1.440 | 74.032 |
| C6 | 100 | 0.11 | 33.60 | 8.00 | 2.880 | 15.094 | 0 | 15.094 |
| C5 | 128 | 0.14 | 8.36 | 3.60 | 0 | 0 | 0 | 0 |
| C2 | 190 | 0.21 | 4.18 | 1.00 | 0 | 0 | 0 | 0 |
| C8 | 79 | 0.09 | 8.36 | 2.00 | 0 | 0 | 0 | 0 |
| C4 | 18 | 0.02 | 9.60 | 2.00 | 0 | 0 | 0 | 0 |
| C7 | 10 | 0.01 | 12.40 | 3.00 | 0 | 0 | 0 | 0 |
| TOTAL | 905 | | 99.24 | 27.0 | 19.08 | 175.47 | | |

As can be seen in Table 2, no channel group is indicated to have a negative net value and the overall value of the system has increased to 175.47. The relative order of the channel has changed as channel group C3 has emerged as the most optimal channel to allocate excess bandwidth towards for this iteration. Thus, at this pass, only three channel groups are allocated bandwidth based upon their relative values.

Now, one may continue the iterative process by assessing the marginal values and opportunity costs of this allocation of excess bandwidth. As the method iterates, one may ultimately arrive at an optimal distribution as shown in Table 3.

TABLE 3

| Channel | Channel Value (CV) | Relative Value | Raw Bandwidth | Minimum Bandwidth | Excess Bandwidth | Marginal Value | Opportunity Cost | Net Value |
|---|---|---|---|---|---|---|---|---|
| C3 | 180 | 0.20 | 13.00 | 4.00 | 9.000 | 122.642 | 7.385 | 115.257 |
| C1 | 200 | 0.22 | 9.60 | 2.40 | 7.200 | 100.629 | 8.775 | 91.854 |
| C6 | 100 | 0.11 | 33.60 | 8.00 | 0 | 41.929 | 0 | 41.929 |
| C5 | 128 | 0.14 | 8.36 | 3.60 | 0 | 24.151 | 0 | 24.151 |
| C2 | 190 | 0.21 | 4.18 | 1.00 | 2.88 | 38.637 | 9.142 | 29.496 |
| C8 | 79 | 0.09 | 8.36 | 2.00 | 0 | 8.281 | 0 | 8.281 |
| C4 | 18 | 0.02 | 9.60 | 2.00 | 0 | 2.830 | 0 | 2.830 |
| C7 | 10 | 0.01 | 12.40 | 3.00 | 0 | 1.572 | 0 | 1.572 |
| TOTAL | 905 | | 99.24 | 27.0 | 19.08 | 340.67 | | |

In Table 3, a culmination of the iterative process shows an optimal allocation of the excess bandwidth (with the caveat of not exceeding the raw bandwidth for ant specific channel group). In this optimal allocation, one can see the total system value is maximized at 340.67.

Figure 3:
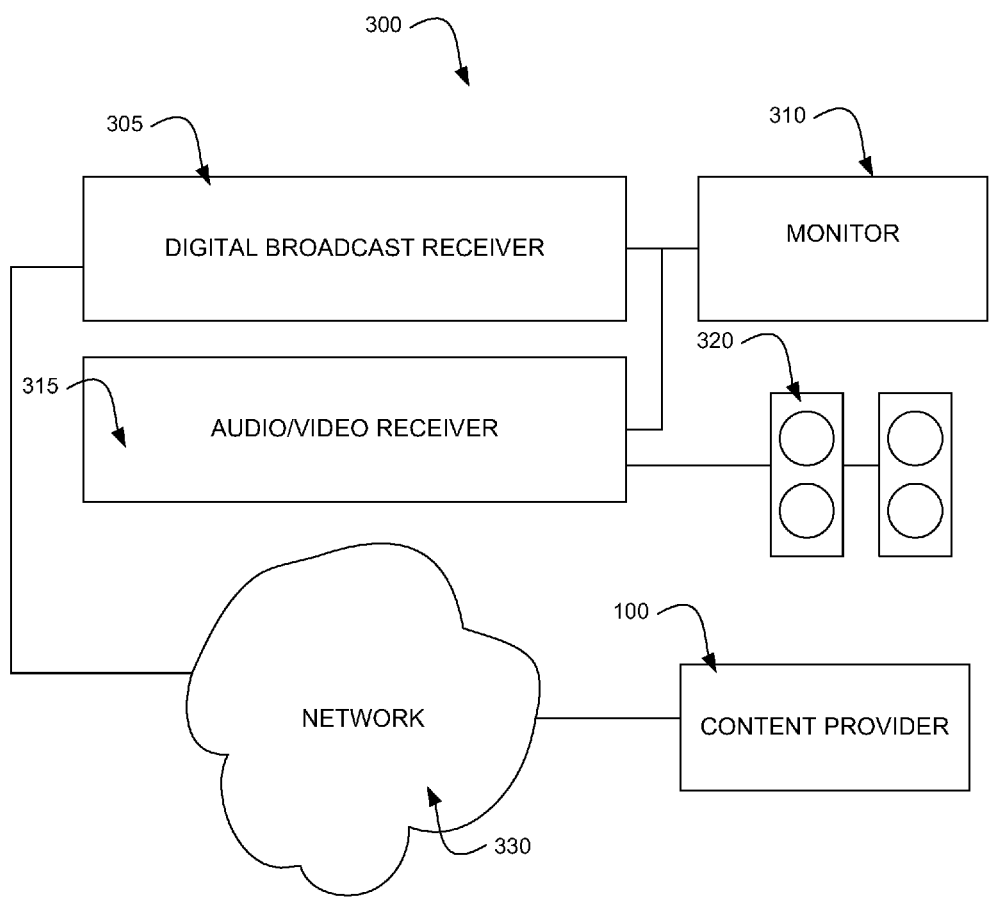
FIG. 3 is a block diagram of a system capable of employing the system of FIG. 1 and the method illustrated in FIG. 2 for optimizing multiplexing data across communication channels according to an embodiment of the subject matter discussed herein.

FIG. 3 is a block diagram of an embodiment of a system 300 that may implement the device 100 of FIG. 1. In this system embodiment, the system 300 may include a digital broadcast receiver 305 having a demultiplexor 306 operable to demultiplex the signal sent from the device 100 at the content provider. The digital broadcast receiver 305 may be coupled to a monitor 310 (which may be a flat-screen television, for example) which may be operable to display video images. Further, digital broadcast receiver 305 may be coupled to an audio/video receiver 315 that is operable to interact with the digital broadcast receiver 305 for manipulating audio and video signals to be displayed on the monitor 310 or played through speakers 320. Further yet, the digital broadcast receiver 305 may be coupled to a network 330 (such as the Internet, for example, or a satellite receiving dish as another example) such that content may be sent to and received from a content provider 340 wherein the device 100 of FIG. 1 is configured to allocate bandwidth for transmission over the network 330.

Such a system 300 may further include any number of devices including a CD player, a DVD player, a Blu-Ray player, a personal computer, a server computer, a smart phone, a wireless personal device, a personal audio player, media storage and delivery system or any other system that may read and write data to and from a storage medium or communication channel. Such additional devices are not shown in FIG. 3.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. An electronic device, comprising:
   a transmission channel having a fixed amount of bandwidth available;
   a plurality of program channels, each program channel associated with a respective performance value and operable to be transmitted on the transmission channel;
   a processor operable to calculate a net value for each program channel that is based on the program channel's respective performance value and an amount of bandwidth required to transmit the respective program channel; and
   a controller operable to iteratively allocate bandwidth to program channels having higher net values until the bandwidth from the transmission channel is depleted.

2. The electronic device of claim 1, wherein each program channel further comprises a minimum operating bandwidth such that a percentage of the a total minimum bandwidth for all program channels is associated with a performance value for each program channel and wherein the processor calculates net values based on the percentage and based on the performance value.

3. The electronic device of claim 2, wherein the processor is further operable to calculate an opportunity cost associated with transmitting data on a first program channel at a first bandwidth and transmitting data on a second program channel at a second bandwidth such that the net value is further based upon the opportunity cost calculated.

4. The electronic device of claim 2, wherein the processor is further operable to calculate an opportunity cost associated with transmitting data on a first program channel at a first bandwidth and transmitting data on the first program channel at a second bandwidth such that the net value is further based upon the opportunity cost calculated.

5. The electronic device of claim 1, wherein the bandwidth for the transmission channel comprises a finite amount.

6. The electronic device of claim 1, wherein the performance value associated with each program channel comprises a subjective numerical assessment of the data provided to the program channel.

7. The electronic device of claim 1, further comprising a memory coupled to the controller and operable to store optimal bandwidth allocation settings.

8. The electronic device of claim 1, wherein each program channel provides data comprising audio and video data.

9. A method for allocating bandwidth amongst program channels over a transmission channel, the method comprising:
   associating an operating value for each program channel amongst a plurality of program channels; and
   iteratively allocating an amount of bandwidth to each program channel based on a comparison the respective associated operating value for each program channel with respect to an overall available bandwidth.

10. The method of claim 9, further comprising calculating an opportunity cost associated with transmitting data on a first program channel at a first bandwidth against transmitting data on a second program channel at a second bandwidth such that the operating value of the first program channel is further based upon the opportunity cost calculated.

11. The method of claim 9, further comprising calculating an opportunity cost associated with transmitting data on a first program channel at a first bandwidth against transmitting data on the first program channel at a second bandwidth such that the operating value of the first program channel is further based upon the opportunity cost calculated.

12. The method of claim 9, wherein bandwidth is allocated iteratively to program channels until a finite amount of bandwidth is allocated.

13. The method of claim 9, further comprising associating a performance value with each program channel based on a subjective numerical assessment of the data transmitted.

14. The method of claim 9, further comprising storing an allocation of bandwidth in a memory as a known bandwidth allocation setting.

15. A system, comprising:
   a transmission channel operable to accommodate transmission of data at a bandwidth BW;
   a plurality of program channels associated with a channel value CVi and associated with an bandwidth usage PFi;
   a processor operable to calculate a marginal value MVi according to:

$$MV_i = CV_i * PF_i / BW$$

the processor further operable to calculate an opportunity cost $OC_{(i,j)}$ according to:

$$OC_{(i,j)} = CV_j * PF_i / BW$$

wherein CVj is associated with the channel value of a second program channel; the processor still further operable to calculate a net value NetVi according to:

$$netV_i = MV_i - OC_{(i,maxIndex)};$$

wherein $OC_{(i, maxIndex)}$ is the opportunity cost associated with the program channel with the next highest marginal value; and a controller operable to distribute available bandwidth across program channels that maximizes net value to the system.

16. A controller, comprising
a plurality to control nodes operable to respectively set a bandwidth for data transmission on one of a plurality of program channels; wherein each program channel is associated with a respective channel value;
a calculator operable to calculate a net value for each program channel that is based on the program channel's respective channel value and an amount of bandwidth required to transmit data associated with each respective program channel; and
a control unit operable to iteratively allocate excess bandwidth to program channels having higher net values until available bandwidth on a transmission channel is depleted.

17. The controller of claim 16, wherein the control unit is operable to allocate bandwidth to a program channel if the controller determines the program channel to have the next highest net value.

18. The controller of claim 16, wherein the control unit is operable to subtract allocated bandwidth from a program channel if the controller determines the net value of a different allocation of bandwidth to be higher for the program channel.

19. An electronic device, comprising
a plurality of program channels having program data operable to be transmitted on a transmission channel;
a processor coupled to each of the plurality of program channels;
a bandwidth management controller coupled to the processor and operable to:
assign performance values to each component based on the underlying data associated with each respective program channel;
iteratively determine an optimal distribution of bandwidth to each program channel based on the performance values of each program channel.

20. The electronic device of claim 19, wherein the bandwidth management controller is further operable to determine a marginal value for an allocation of bandwidth to each component in relation to allocating bandwidth to another program channel.

21. The electronic device of claim 19, wherein the bandwidth management controller is further operable to determine an opportunity cost value for allocating a specific amount of bandwidth to each component in relation to allocating a different specific amount of bandwidth to each component.

22. The electronic device of claim 19, wherein the bandwidth management controller is further operable to maintain a minimum allocation of bandwidth by for each program channel.

23. The electronic device of claim 19, wherein the bandwidth management controller is further operable to:
receive an input to change the performance values of at least one program channel; and
perform a second iterative determination of an optimal allocation of bandwidth to each program channel based on the performance values of each program channel.

24. An audio/video transmitter, comprising:
a transmitter operable to be coupled to a transmission channel having a fixed amount of bandwidth available;
a plurality of audio/video program channels, each program channel associated with a respective channel value;
a processor operable to calculate a net value for each program channel that is based on the program channel's respective channel value and an amount of bandwidth required to transmit underlying data associated with the program channel; and
a controller operable to iteratively allocate bandwidth to program channels having higher net values until the available bandwidth on the transmission channel is depleted.

25. The audio/video transmitter of claim 24, wherein the fixed amount of bandwidth comprises a limitation placed on the transmission channel to comply with signal quality parameters.

* * * * *